US010725641B2

(12) United States Patent
Su et al.

(10) Patent No.: US 10,725,641 B2
(45) Date of Patent: Jul. 28, 2020

(54) DUAL-FUNCTIONALITY INPUT MECHANISM FOR A COMMUNICATION DEVICE

(71) Applicant: MOTOROLA SOLUTIONS, INC., Chicago, IL (US)

(72) Inventors: Qiao Su, Sichuan (CN); Huimin Han, Sichuan (CN); Haiqing Hu, Sichuan (CN); Jiwen Liu, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 242 days.

(21) Appl. No.: 15/756,508

(22) PCT Filed: Sep. 18, 2015

(86) PCT No.: PCT/CN2015/090048
§ 371 (c)(1),
(2) Date: Feb. 28, 2018

(87) PCT Pub. No.: WO2017/045209
PCT Pub. Date: Mar. 23, 2017

(65) Prior Publication Data
US 2018/0267697 A1  Sep. 20, 2018

(51) Int. Cl.
*G06F 3/0484* (2013.01)
*H04M 1/23* (2006.01)
(Continued)

(52) U.S. Cl.
CPC ........ *G06F 3/04847* (2013.01); *G06F 3/0362* (2013.01); *G06F 3/0482* (2013.01);
(Continued)

(58) Field of Classification Search
CPC .... G06F 3/04847; G06F 3/0362; G06F 9/445; H04M 1/236; H04M 1/233
See application file for complete search history.

(56) References Cited

U.S. PATENT DOCUMENTS 5,798,752 A * 8/1998 Buxton ................... G06F 3/038
345/157
2008/0167071 A1* 7/2008 Forstall ................. G06F 9/4451
455/556.2
(Continued)

FOREIGN PATENT DOCUMENTS

CN       101281443      10/2008
CN       102629184       8/2012
(Continued)

OTHER PUBLICATIONS

PCT/CN2015/090048 International Search Report and Written Opinion of the International Searching Authority dated Jun. 13, 2016 (11 pages).

*Primary Examiner* — Roland J Casillas
(74) *Attorney, Agent, or Firm* — Michael Best & Friedrich LLP

(57) ABSTRACT

A communication device and methods for operating the same. One communication device includes a memory storing a software application, an electronic processor, a mechanical interface receiving a first user input, and a touch screen receiving a second user input. The touch screen is also configured to display an output generated by the software application. The electronic processor is configured to execute a software application stored in the memory, determine when the second user input is received simultaneously with the first user input, perform a first action based on the first user input when the second user input is not received simultaneously with the first user input, the first action being unrelated to operation of the software application, and perform a second action based on the first user input when the second user input is received simultaneously with the first user input, the second action relating to the operation of the software application.

19 Claims, 19 Drawing Sheets

(51) Int. Cl.
*G06F 3/0362* (2013.01)
*G06F 3/0481* (2013.01)
*G06F 3/0482* (2013.01)
*G06F 3/0488* (2013.01)
*G06F 9/445* (2018.01)
*H04W 4/10* (2009.01)

(52) U.S. Cl.
CPC ........ *G06F 3/0488* (2013.01); *G06F 3/04817* (2013.01); *G06F 9/445* (2013.01); *H04M 1/236* (2013.01); *H04M 1/233* (2013.01); *H04M 2250/22* (2013.01); *H04W 4/10* (2013.01)

(56) References Cited

U.S. PATENT DOCUMENTS

2010/0291883 A1* 11/2010 Lim .................... H04B 1/3833
455/90.2
2011/0208052 A1    8/2011 Entrekin

FOREIGN PATENT DOCUMENTS

| CN | 102722332 | 10/2012 |
| CN | 203812188 | 9/2014 |
| JP | 2011192173 | 9/2011 |

\* cited by examiner

DUAL-FUNCTIONALITY INPUT MECHANISM FOR A COMMUNICATION DEVICE

BACKGROUND OF THE INVENTION

Wireless communication devices, such as smart telephones and two-way radios, execute software applications that perform a variety of tasks. For example, these software applications provide functionality to send and receive electronic text and mail messages, browse the Internet, receive or send a picture, and or review various documents. A communication device can display output from the software application on a touch screen that also operates as a user input interface to the software application.

In some situations, a communication device also includes one or more mechanical interfaces (e.g., buttons, knobs, switches, and the like) that operate as a user input interface to the communication device. These mechanical interfaces, however, typically operate independent of a software application being executed by the communication device. For example, a button included in a communication device may, open receipt of user input, cause a change to the volume of a ringer of the communication device without changing the operation of a software application being executed by the communication device. Similarly, mechanical interlaces included in a communication device may be configured to change a transmission channel, transmit a radio transmission (e.g., a push-to-talk button), and power on and off the communication device.

Public safety personnel that provide services in emergency situations often use communication devices. For example, police officers, medical first responders, fire fighters, military personnel, and the like may use communication devices, such as two-way radios or converged devices (for example, a combination of a smart telephone and a two-way radio). In some situations, when a communication device is used by public safety personnel, the mechanical interfaces are used for operations related to public safety (e.g., radio transmissions) and the touch screen (and the software applications available through the touch screen) is used for operations related to personal communication (e.g., cellular communications, contact management, calendar, and the like). Still, in some emergency situations, public safety personnel may need to quickly access and use functionality provided by one or more software applications. Interacting with a software application solely through the touch screen, however, may require multiple inputs that introduce delay. For example, switch between software applications executed by the communication device, user inputs for minimizing a current application and selecting a new software application must be received through the touch screen. In addition, although some communication devices allow a mechanical interface to be re-programmed with particular functionality, this type of re-configuration requires user interaction and overrides the default functionality of the mechanical interface, which is also useful to a user. Accordingly, there is a need for a communication device that provides improved and more efficient user interactions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form pan of the specification, and serve to further illustrate embodiments of concepts that include the claimed invention, and explain various principles and advantages of those embodiments.

Figure 1:
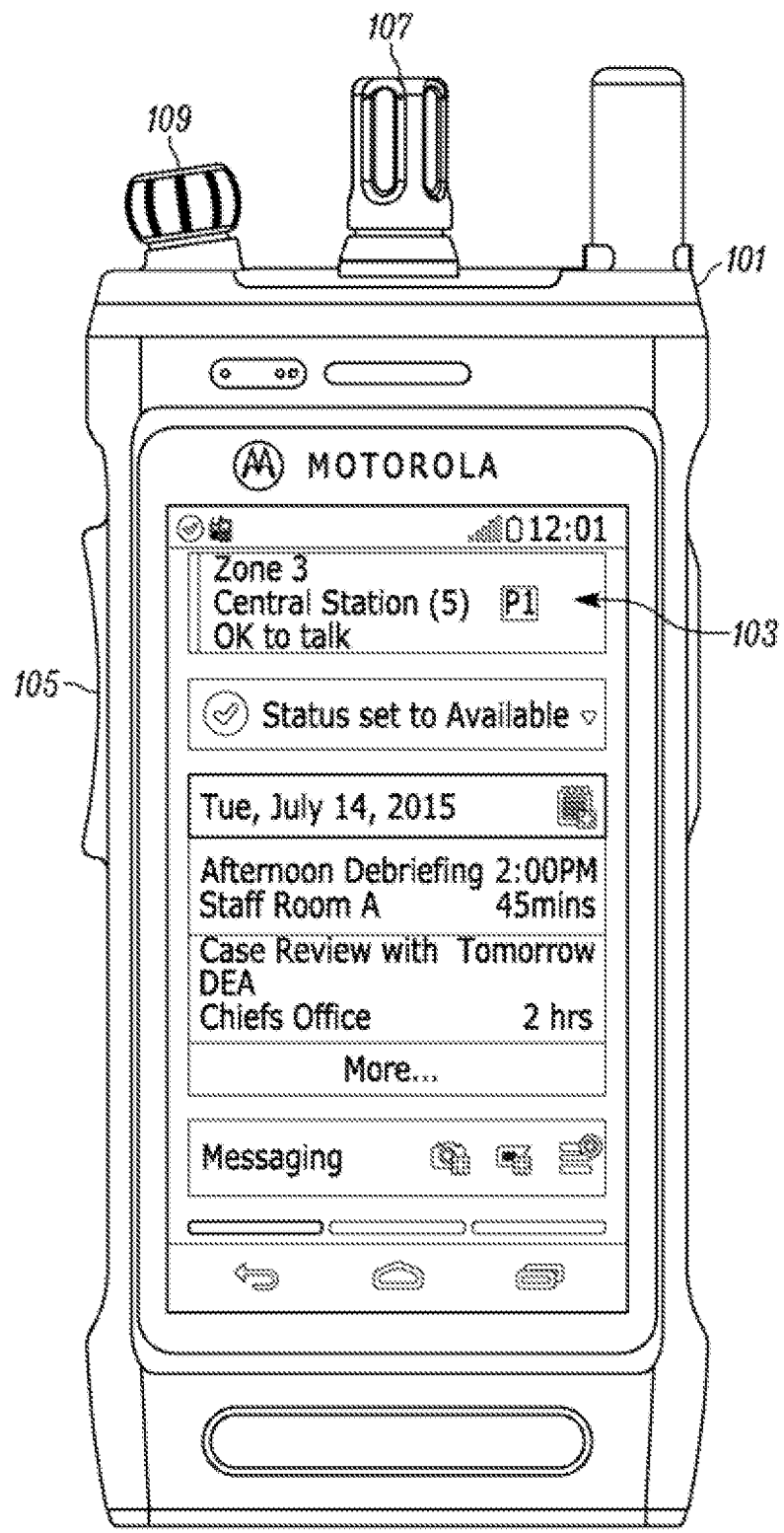
FIG. 1 illustrates a communication device including a touch screen and a plurality of mechanical interfaces according to one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus anal method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the invention include a communication device including a mechanical interface configured to receive a first user input and a touch screen configured to display an output generated by at least one software application and to receive a second user input. The communication device also includes an electronic processor configured to determine when the second user input is received simultaneously with the first user input. When the second user input is not received simultaneously with the first user input, the electronic processor is configured to perform a first action based on the first user input, wherein the first action is unrelated to operation of the at least one software application. When the second user input is received simultaneously with the first user input the electronic processor is configured to perform a second action, wherein the second action is related to the operation of the at least one software application.

FIG. 1 illustrates a communication device 101 according to one embodiment. The communication device may be a cellular telephone, a smart telephone, a smart watch, a tablet computer, a personal computer, a personal digital assistant (PDA), another device configured to communicate over at least one communication network in one embodiment, the communication device 101 is a converged device used by public safety personnel to communicate over multiple communication networks, for example, a cellular network and a radio network (e.g., a land mobile radio (LMR) network). However, it should be understood that embodiments described herein are not limited to converged devices.

The communication device 101 includes a plurality of interfaces that operate as user input interfaces. For example, as illustrated in FIG. 1, the communication device 101 includes a touch screen 103. In some embodiments, the touch screen 103 includes a liquid crystal display (LCD). The touch screen 103 is a touch-sensitive interface which operates as both a display and an input interact. In particular, the touch screen 103 displays output to a user (e.g., webpages and other graphical user interfaces (GUIs) generated by software applications) and also receives user input using detected physical contact (e.g., detected capacitance or resistance).

The communication device 101 also includes a plurality of mechanical interfaces that operate as user input interfaces. As illustrated in FIG. 1, the mechanical interfaces may include a push-to-talk button 105, a channel selection knob 107, and a volume knob 109.

It should be understood that the user input interfaces illustrated in FIG. 1 are provided as examples of user input interfaces and other types of user input interfaces may be used with embodiments described herein, including other types of mechanical interfaces.

Each of the mechanical interfaces is assigned a primary or default action that is generally unrelated to a software application being executed by the communication device 101. For example, the primary action assigned to the push-to-talk button 105 includes transmitting and receiving radio transmissions based on received user input (e.g., depression and release of the push-to-talk button 105). In some embodiments, the posh-to-talk button 105 is a momentary button to switch from a voice reception mode to a voice transmit mode to enable instantaneous communication over half-duplex communication systems, including, for example, two-way radio communication channels. Accordingly, when the push-to-talk button 105 receives user input in the form of a depression force, the push-to-talk button 105 switches to the voice transmit mode. Similarly, when the push-to-talk button 105 receives user input in the form of release of the depression force, the push-to-talk button 105 switches to the voice reception.

The primary action assigned to the channel selection knob 107 includes selecting a transmission channel (e.g., for radio transmissions). In particular, the channel selection knob 107 is rotatable through a plurality of positions, wherein each of the plurality of positions is associated with a particular transmission channel. Accordingly, user input received through the channel selection knob 107 includes selection of one of the plurality of positions (e.g., through clockwise rotation or counter-clockwise rotation of the channel selection knob 107).

The primary action assigned to the volume knob 109 includes selecting a volume for audio output of the communication device 101, including audio messages received over at least one communication network, based on received user input. In some embodiments, the volume knob 109 is rotatable through a plurality of positions, wherein each of the plurality of positions is associated with a particular audio level. Accordingly, user input received through the volume knob 109 includes selection of one of the plurality of positions (e.g., through clockwise rotation or counter-clockwise rotation of the volume knob 109).

Figure 2:
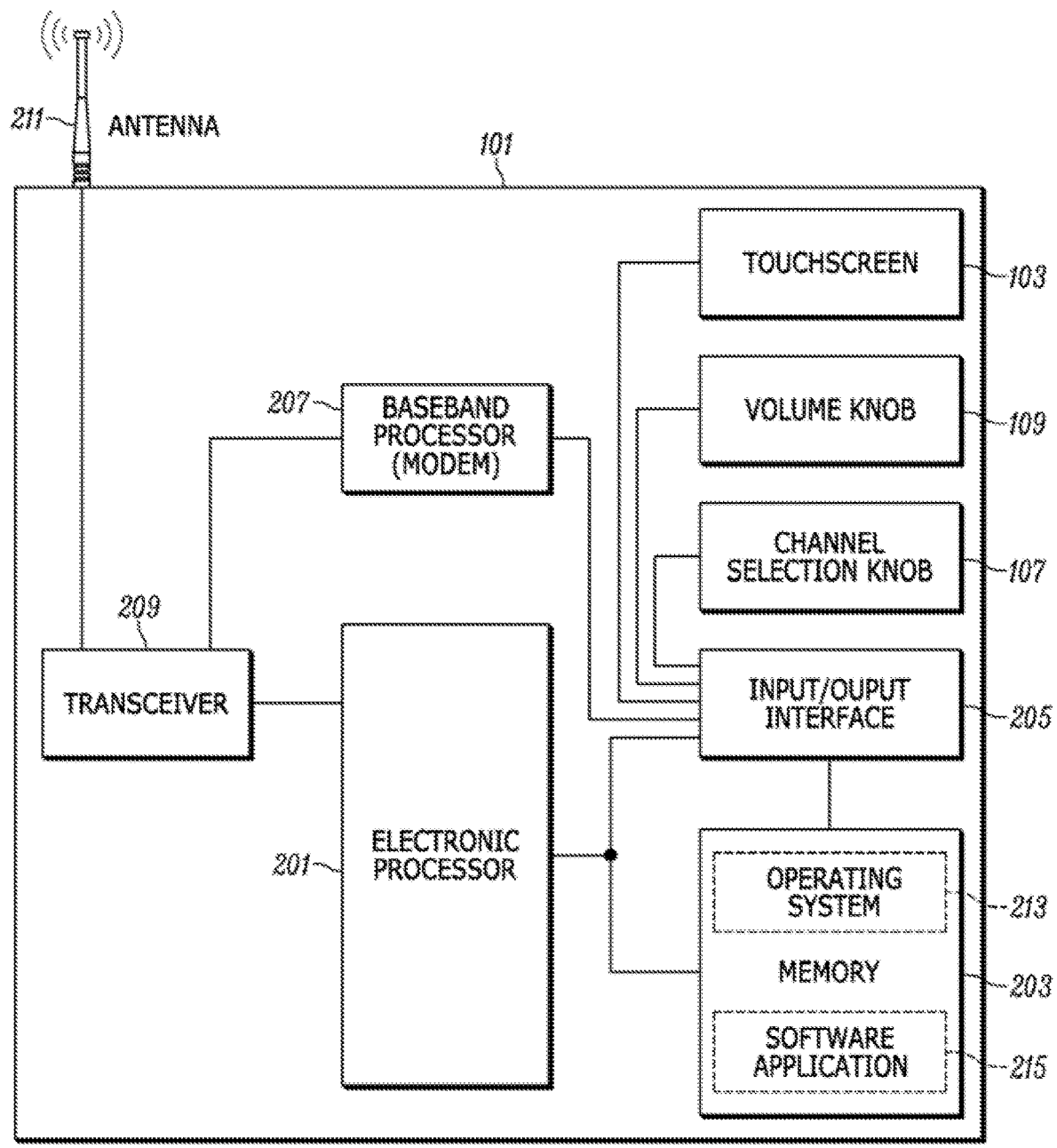
FIG. 2 schematically illustrates hardware included in the communication device of FIG. 1 according to one embodiment.

As illustrated in FIG. 2, the communication device 101 includes an electronic processor 201 (e.g., a microprocessor or another suitable programmable device), a memory 203 (e.g., non-transitory, computer-readable storage medium), an input/output interface 205, a baseband processor 207 (e.g., a network modem), a transceiver 209, and an antenna 211. The electronic processor 201, the memory 203, the input/output interface 205, the baseband processor 207, and the transceiver 209 communicate over one or more control or data buses or connections.

The memory 203 may include a program storage area (e.g., read only memory (ROM) and a data storage area (e.g., random access memory (RAM), and another non-transitory, computer-readable medium). The electronic processor 20 is coupled to the memory 203 and executes computer-readable instructions ("software") stored in the memory 203. For example, as illustrated in FIG. 2, the memory 203 stores an operating system 213 and one or more software applications 215. It should be understood that the functionality described herein can be performed by the operating system 213, a software application 215, or a combination thereof.

The input/output interface 205 communicates with the user input interfaces of the communication device 101 including the touch screen 103 and the mechanical interfaces. The baseband processor 207 encodes and decodes digital data sent and received by the transceiver 209 to and from a wireless communication network via the antenna 211. The wireless communication network may include, one or more radio networks (e.g., LMR), cellular networks (e.g., Long-Term Evolution (LTE) Time Division Multiple Access (TDMA), and Code Division Multiple Access (CDMA)), and other local and wide area networks. The wireless communication network may also have one or more connections to a public switched telephone network (PSTN), the Internet, or both.

As noted above, each mechanical interface (e.g., the push-to-talk button 105, the channel selection knob 107, and the volume knob 109) is assigned a primary action that operates independent of a software application being executed by the communication device 101. For example, when the touch screen 103 is displaying a webpage generated by a browser application and the Channel selection knob 107 receives user input (i.e., is rotated), the operation of the channel selection knob 107 does not modify the operation or output of the browser application. In this way, the mechanical interfaces provide functions related to public safety operations, such as, for example, channel selection and message transmission, while the communication device 101 is executing one or more software applications for performing personal communication functions.

However, in some situations, the communication device 101 may operate more of if one or more of the mechanical interfaces also receives user input for interacting with a software application being executed by the communication device 101. Accordingly, one or more of the mechanical interfaces may be assigned, a secondary action that is associated with a software application being executed by the communication device 101. Thus, in these situations, a mechanical interface provides dual-functionality by providing primary actions (e.g., related to public safety operations) and secondary actions relating to a software application being executed by the communication device related to personal communications).

For example, in a primary or normal mode, a mechanical interface is configured to perform, in response to received user input, a first action unrelated to the software application 215 being executed by the communication device 101. However, in a secondary or special mode, a mechanical interface is configured to perform, in response to received user input, a second action related to the software application 215 being executed by the communication device 101.

In some embodiment, the mode of a mechanical interface depends on whether user input is received by the mechanical interface simultaneously with user input received through the touch screen 103. Accordingly, a mechanical interface retains its normal operation for performing the primary action (e.g., depression or rotation), but can also be used to perform a secondary action if user input is simultaneously received through another interface of the communication device 101, such as the touch screen 103. As used in the present application, the term simultaneously means overlapping in time regardless of duration. Therefore, if user input is received through the touch screen 103 at an overlapping time with user input received through a mechanical interface, the user input is considered received simultaneously.

Figure 3:
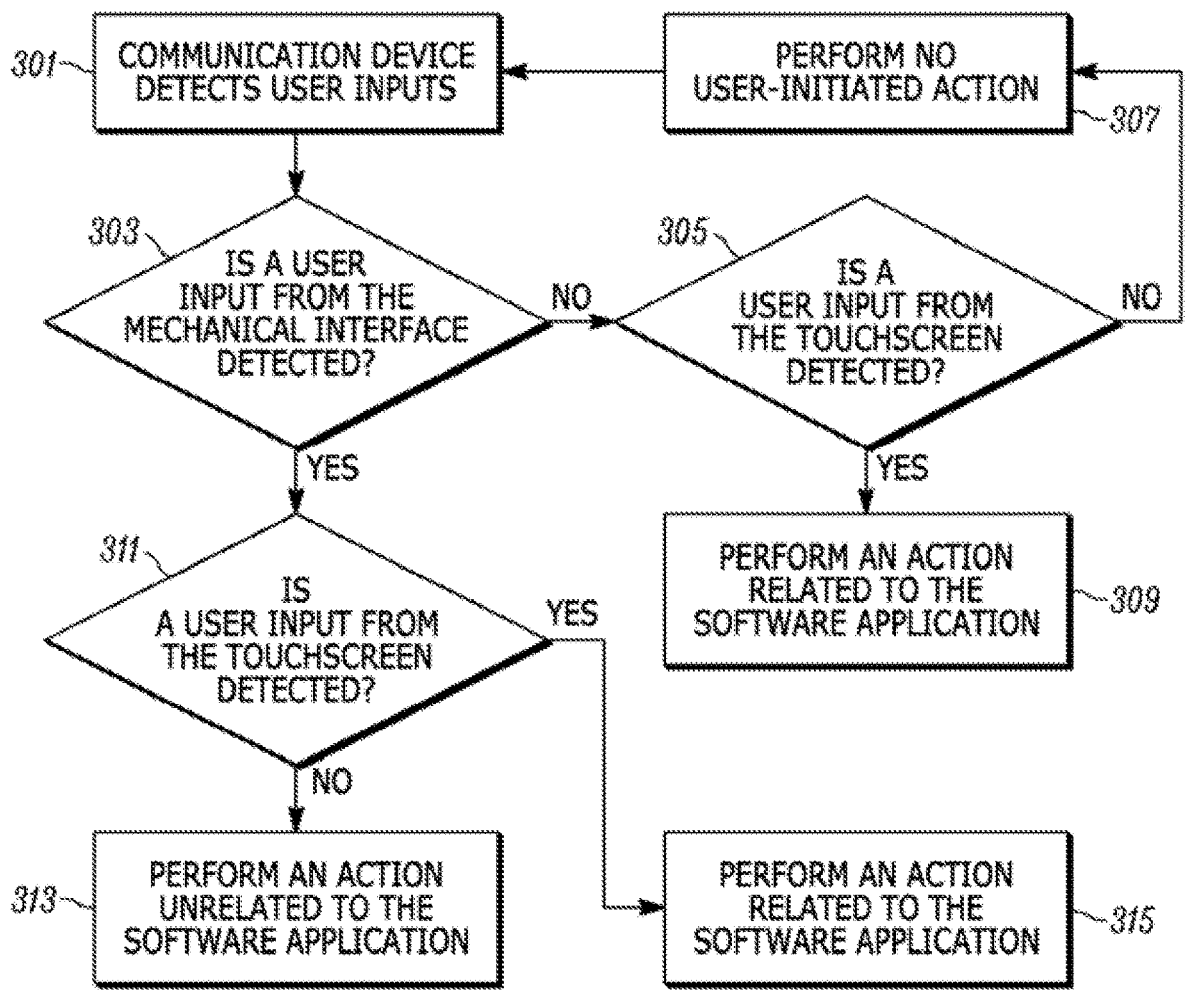
FIG. 3 is a flowchart illustrating a method of processing received user inputs by the communication device of FIG. 1 according to one embodiment.
Figure 4A:
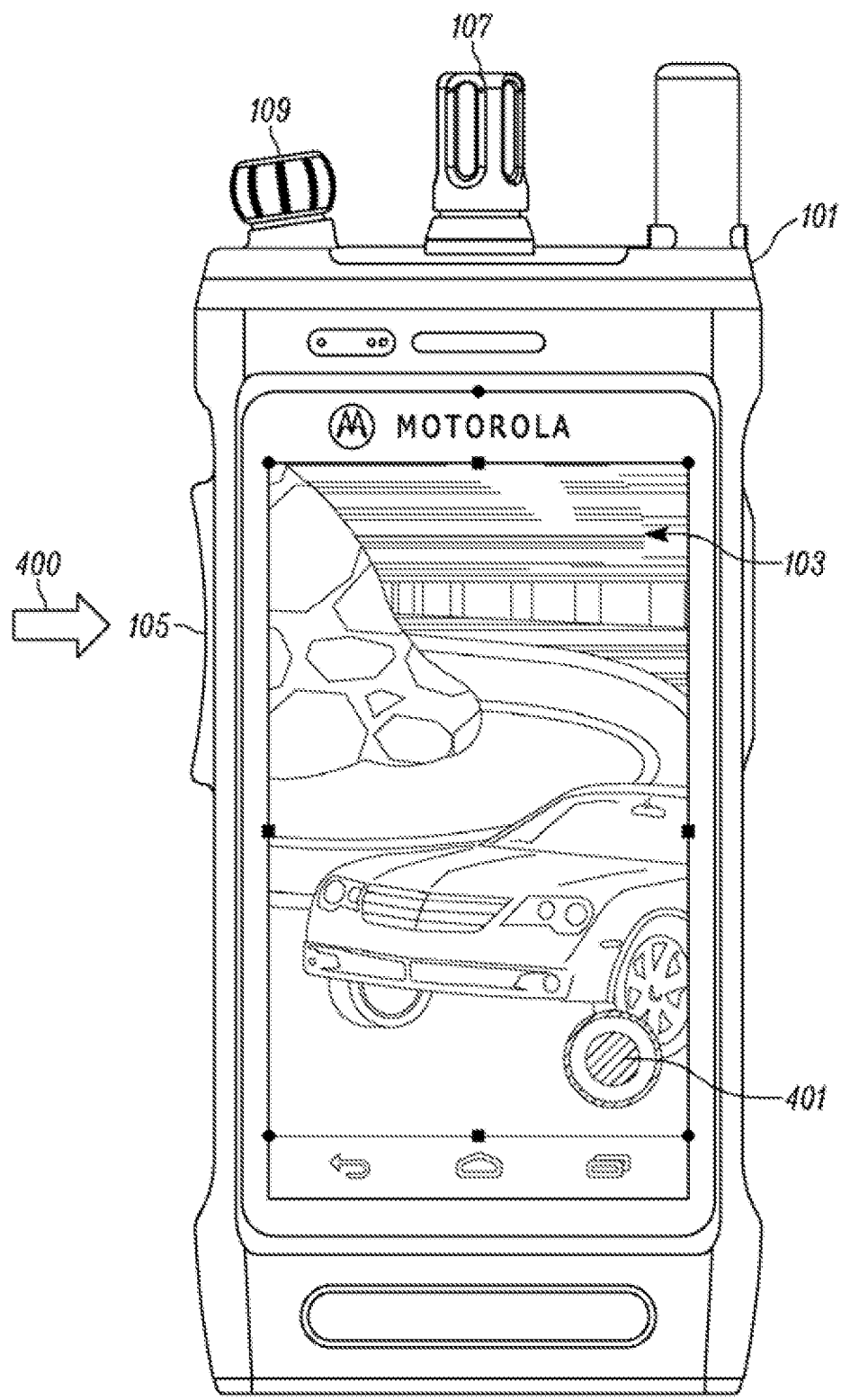
FIG. 4A illustrates user inputs received by the communication device of FIG. 1 for transmitting an image displayed by the communication device according to one embodiment.
Figure 4B:
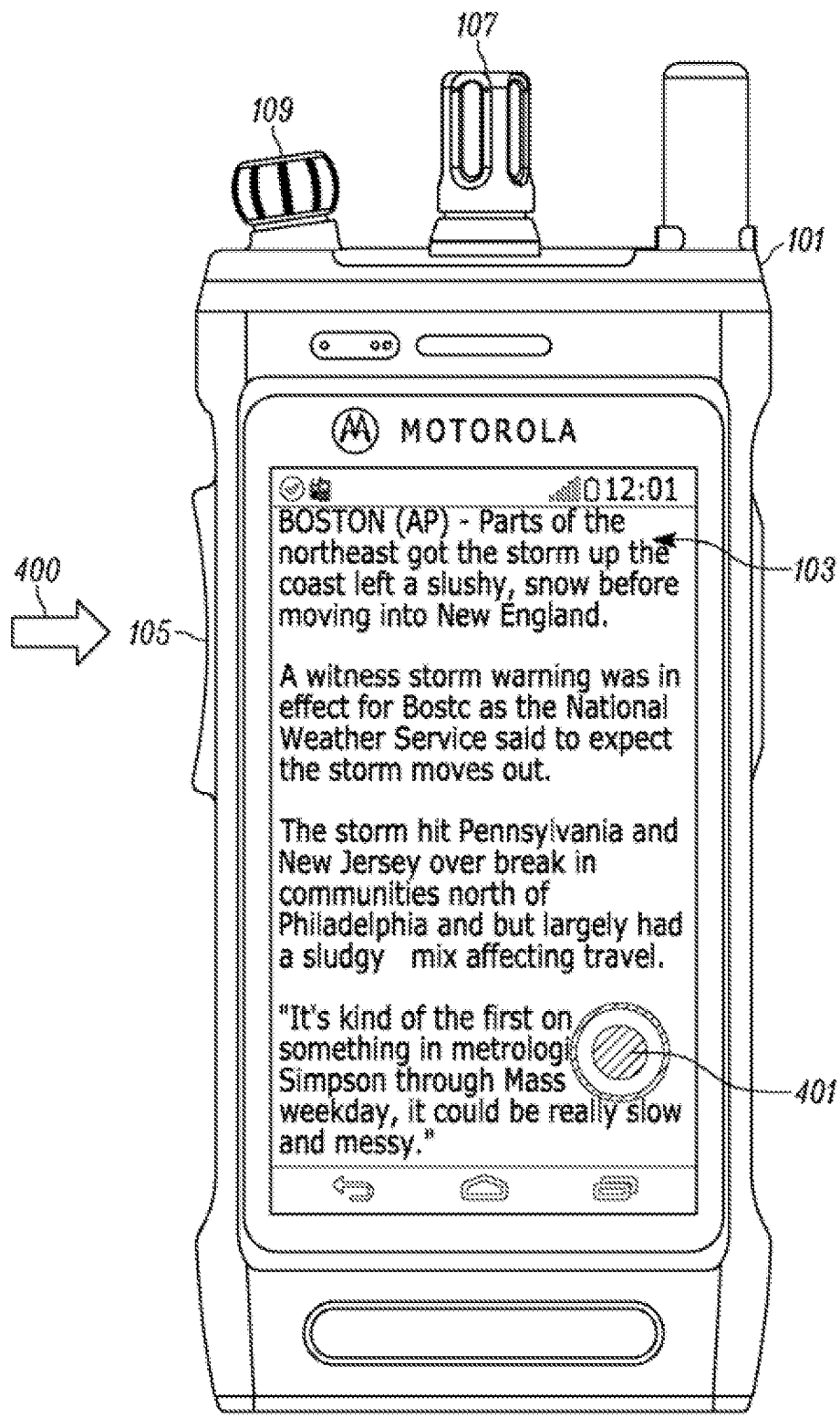
FIG. 4B illustrates user inputs received by the communication device of FIG. 1 for transmitting text displayed by the communication device according to one embodiment.

FIG. 3 illustrates a method 300 performed by the communication device 101 (e.g., the operating system 213 as executed by the electronic processor 201) for processing user input according to one embodiment. As illustrated in FIG. 3, during operation, the communication device 101 monitors and detects user input received through the user input interfaces (at block 301). When no user input is received through the mechanical interfaces (at block 303) and no user input is received through the touch screen 103 (at block 305), the communication device 101 per no user initiated action (at block 307).

Alternatively, when no user input is received through the mechanical interfaces (at b 303) hut user input is received through the touch screen 103 (at block 305), the communication device 101 performs an action related to the software application being executed by the communication device 101 (block 309). For example, the communication device 101 may alert the software application that the touch screen 103 received a user input such that the software application can respond to the user input accordingly. For example, the software application can change the generated GUI in response to receiving user input such as a swipe, a selection of a particular icon, or text.

Also, when user input is received through one of the mechanical interfaces (at block 303) but simultaneous user input is not received through the touch screen 103 (at block 311), the communication device 101 responds to the user input received through the mechanical interface by performing the primary action assigned to the mechanical interface (at block 313). As noted above, the operation of any software application being executed by the communication device 101 is generally not impacted based an the performance of the primary action.

However, when user input is received through one of the mechanical interfaces (at block 303) and simultaneous user input is received through the touch screen 103 (at block 311), the communication device 101 responds to the user input received through the mechanical interface by performing the secondary action assigned to the mechanical interface (at block 315).

In some embodiments, the secondary action is based, at least in part, on which mechanical interface received user input and the type of user input received. For example, the communication device 101 can be configured to perform a different secondary action based on whether the channel selection knob 107 or the volume knob 109 receives user input. Similarly, the communication device 101 can be configured to perform a different secondary action based on whether the channel selection knob 107 receives user input of clockwise rotation or counter-clockwise rotation or the current position of the channel selection knob 107 or the volume knob 109.

Also, in some embodiments, the communication device 101 performs the secondary action based on the user input received through the touch screen 103, such as the type of received input (e.g., a single tap, a double tap, a swipe, and the like) or the location of the received input (e.g., where on the touch screen 103 the user input is received). For example, the communication device 101 can be configured to perform a different secondary action based on whether the touch screen 103 receives a tap or a swipe. Similarly, the communication device 101 can be configured to perform a different secondary action based on whether the user input was received at a middle of the touch screen 103, a corner of the touch screen 103, or at a location of a particular icon displayed on the touch screen 103.

Also, it should be understood that the communication device 101 can be configured to perform the secondary action by sending a signal to a software application executed by the communication device indicating of the type of received user input. For example, the operating system 213 can be configured to respond to received user input directly (e.g., changing channels, changing volume, and the like) or by sending a message to one or more software applications. The message can alert the software applications of the particular user input received (e.g., the channel selection knob 107 received clockwise rotation through one position and the touchscreen 103 received a tap at particular coordinates of the touchscreen 103), provide instructions for taking an action (e.g., display a home screen), or a combination thereof. Accordingly, in some embodiments, the operating system 213 and one or more software applications coordinate operation to perform the secondary action.

FIGS. 4 through 9 illustrate the communication device 101 configured to perform several exemplary secondary actions based on inputs from the mechanical interface. For example, as illustrated in FIG. 4A, when a software application being executed by the communication device 101 is displaying an image through the touch screen 103 and the push-to-talk button 105 is activated (represented by a depression force 400) simultaneously with the touch screen 103 (represented by an example location of contact 401), the communication device 101 transmits the displayed image over a communication network to a predetermined destination (e.g., included in an e-mail message or a test message). For example, within the public safety context, the communication device 101 can quickly transmit a displayed image to an emergency dispatch center or in-field personnel using the secondary action assigned to the push-to-talk button 105 without requiring user inputs for copying the image to a message (e.g., an e-mail message or a text message), composing and addressing the message and sending the message, which adds delay and potentially introduces manual errors. Other types of messages may also be sent. For example, as illustrated in FIG. 4B, the communication device 101 detects the depression force 400 and simultaneous activation of the touch screen 103 when text is displayed on the touch screen 103, and the communication device 103 transmits the displayed text over a communication network to a predetermined destination.

Figure 5A:
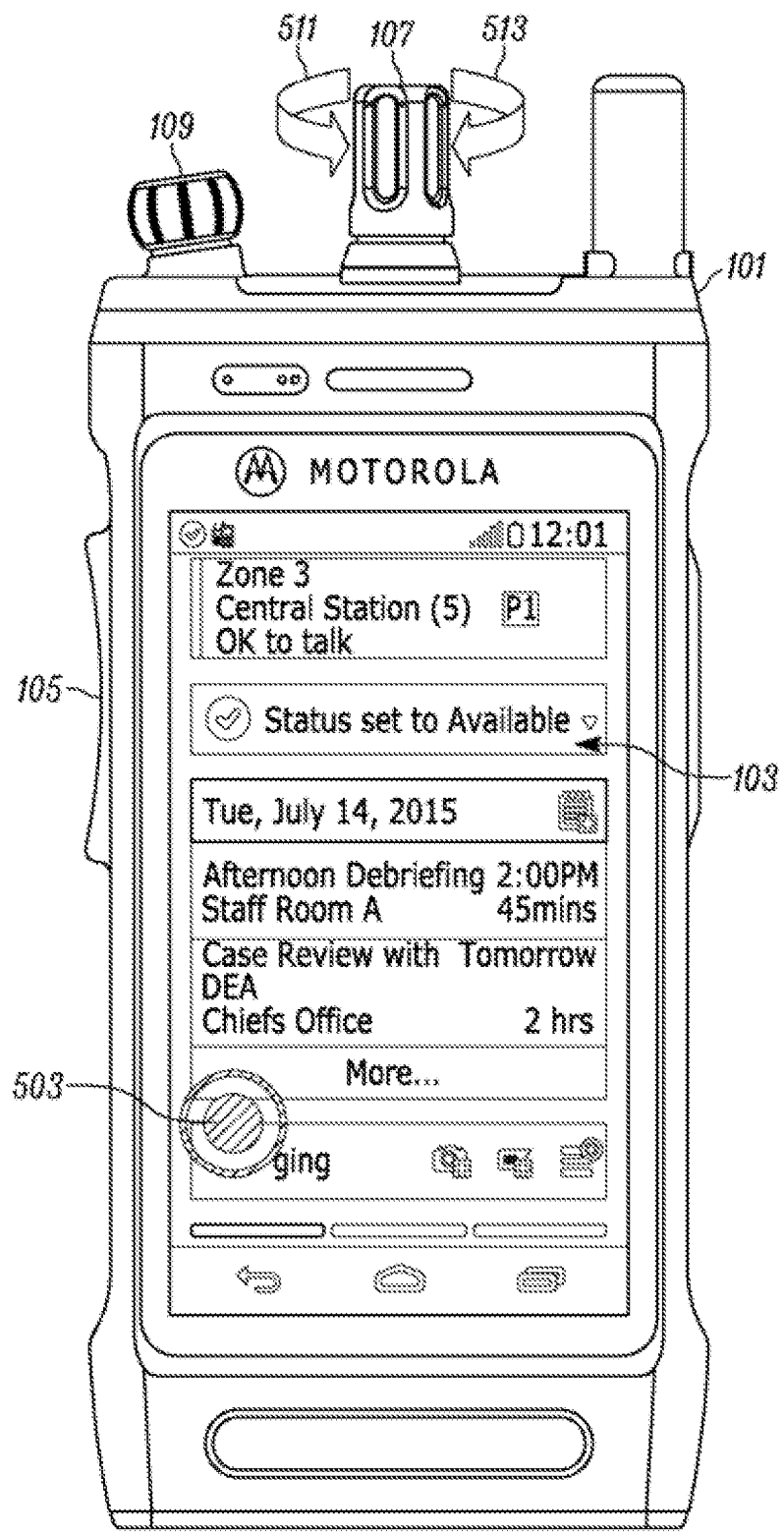
FIGS. 5A through 5C illustrate user inputs received by the communication device of FIG. 1 for accessing a software application menu according to one embodiment.
Figure 5B:
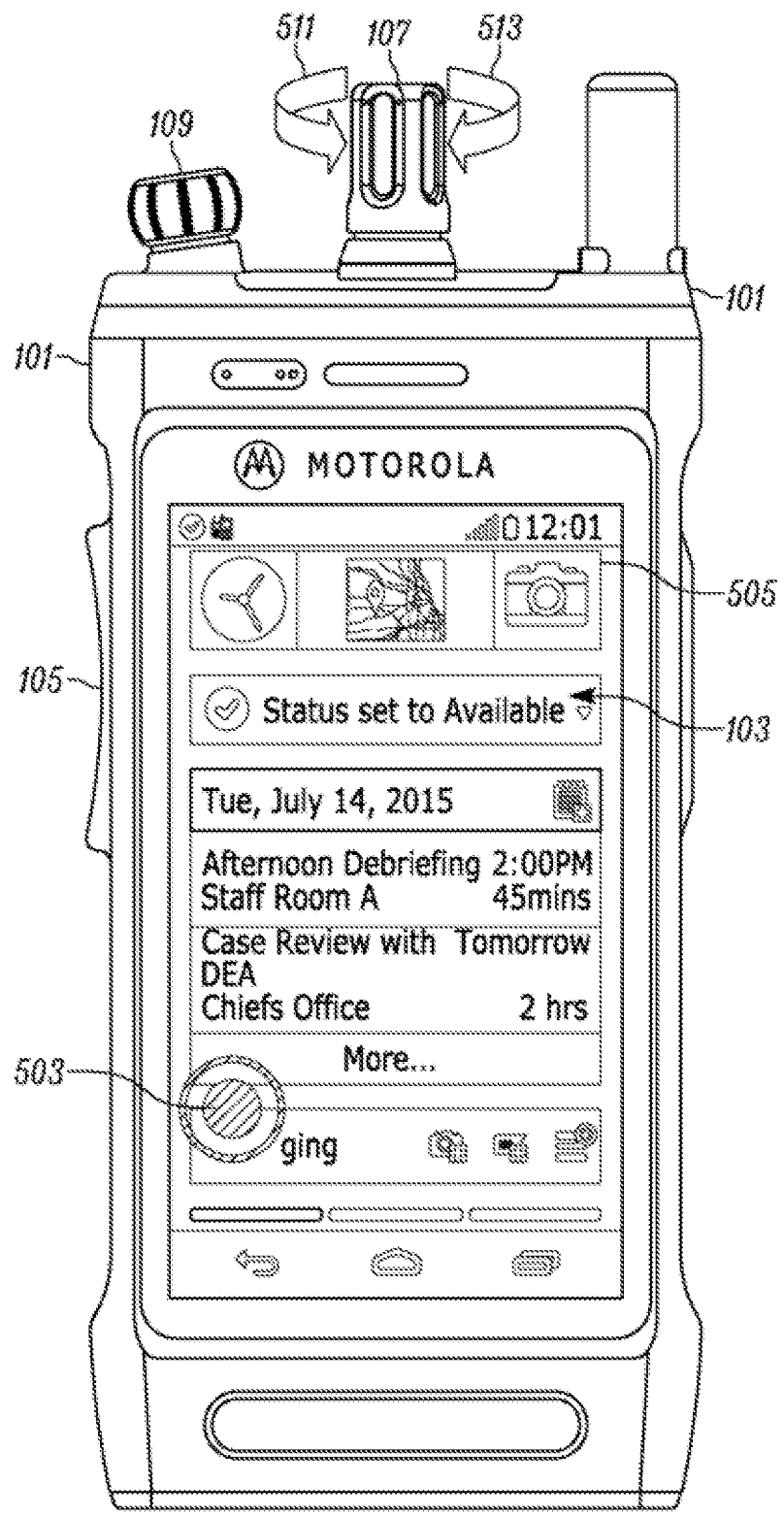
Figure 5C:
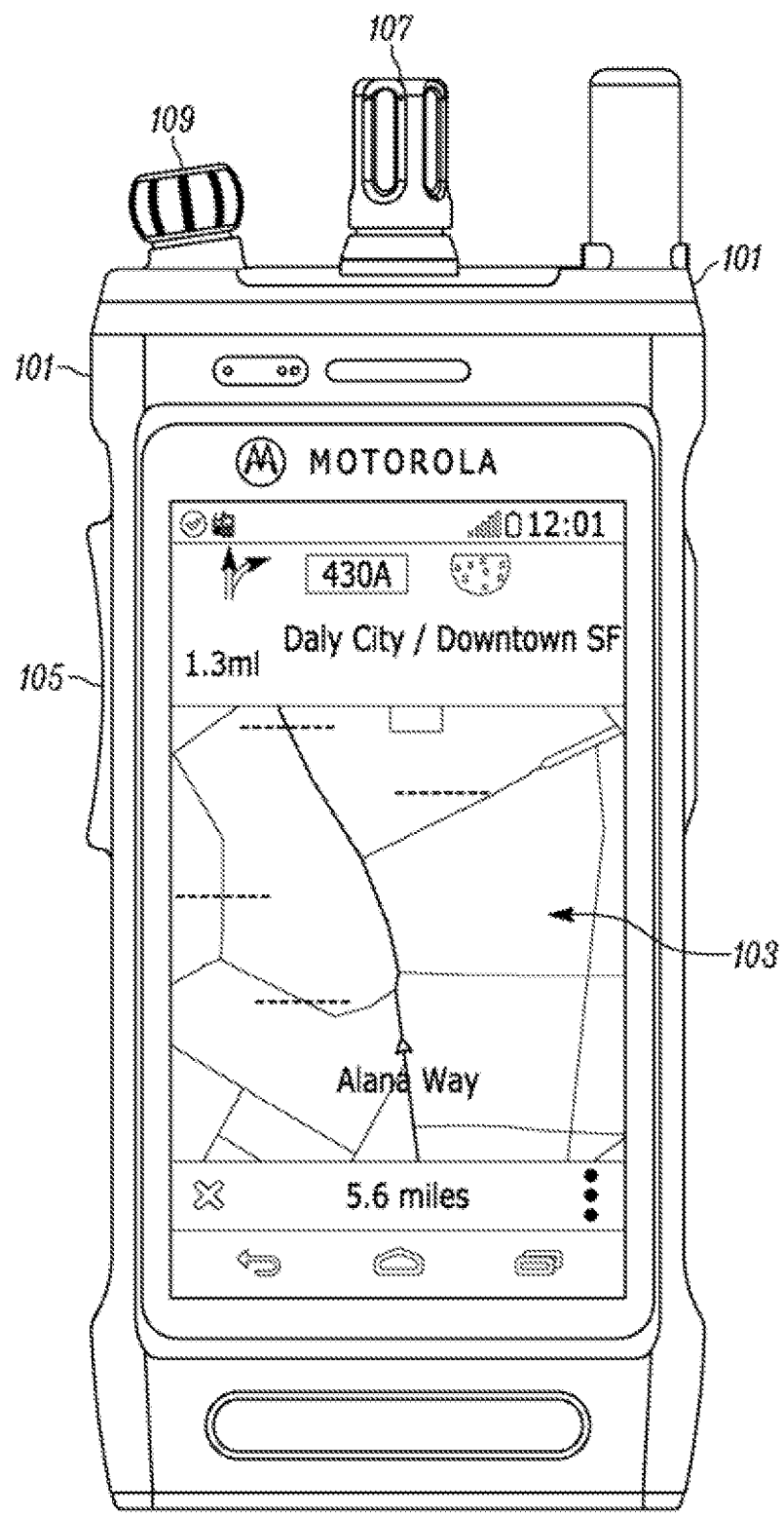

FIGS. 5A through 5C illustrate another example of the communication device 101 configured to perform a secondary action based on user inputs received from the mechanical interface. In particular, FIGS. 5A through 5C illustrate a sequence of outputs provided through the touch semen 103. When the communication device 101 detects a user input from the touch semen 103 (illustrated by an example location 503 in FIG. 5A) and simultaneously detects turning of the channel selection knob 107, the communication device 101 outputs an application menu 505 through the touch screen 103 (see FIG. 5B). The application menu 505 includes icons associated with the software application 215 (e.g., active software applications 215, frequently-used software applications 215, mission critical software applications 215, or the like). The communication device 101 launches a software application 215 associated with the icon when the icon is selected by a user input. The communication device 101 may receive the selection at an icon from a used input on the touch screen 103 on the particular icon. Alternatively, the communication device 101 receives a counter-clockwise rotation 511 via the channel selection knob 107 to select an icon to the left of the currently selected icon. Similarly, the communication device 101 receives a clockwise rotation 513 via the channel select knob 107 to select an icon to the right of the currently selected icon. As a consequence, for each discrete movement of the channel selection knob 107, the communication device 101 sews a different icon (i.e., active and highlighted). When contact is released from the touch screen 103 (e.g., when the user lifts his thumb from the touch screen 103) the communication device 101 launches the corresponding software application 215 (see FIG. 5C). Accordingly, the channel selection knob 107 in the secondary mode may quickly change between software applications 215 without requiring that a running software application be exited before running the new software application.

Figure 6A:
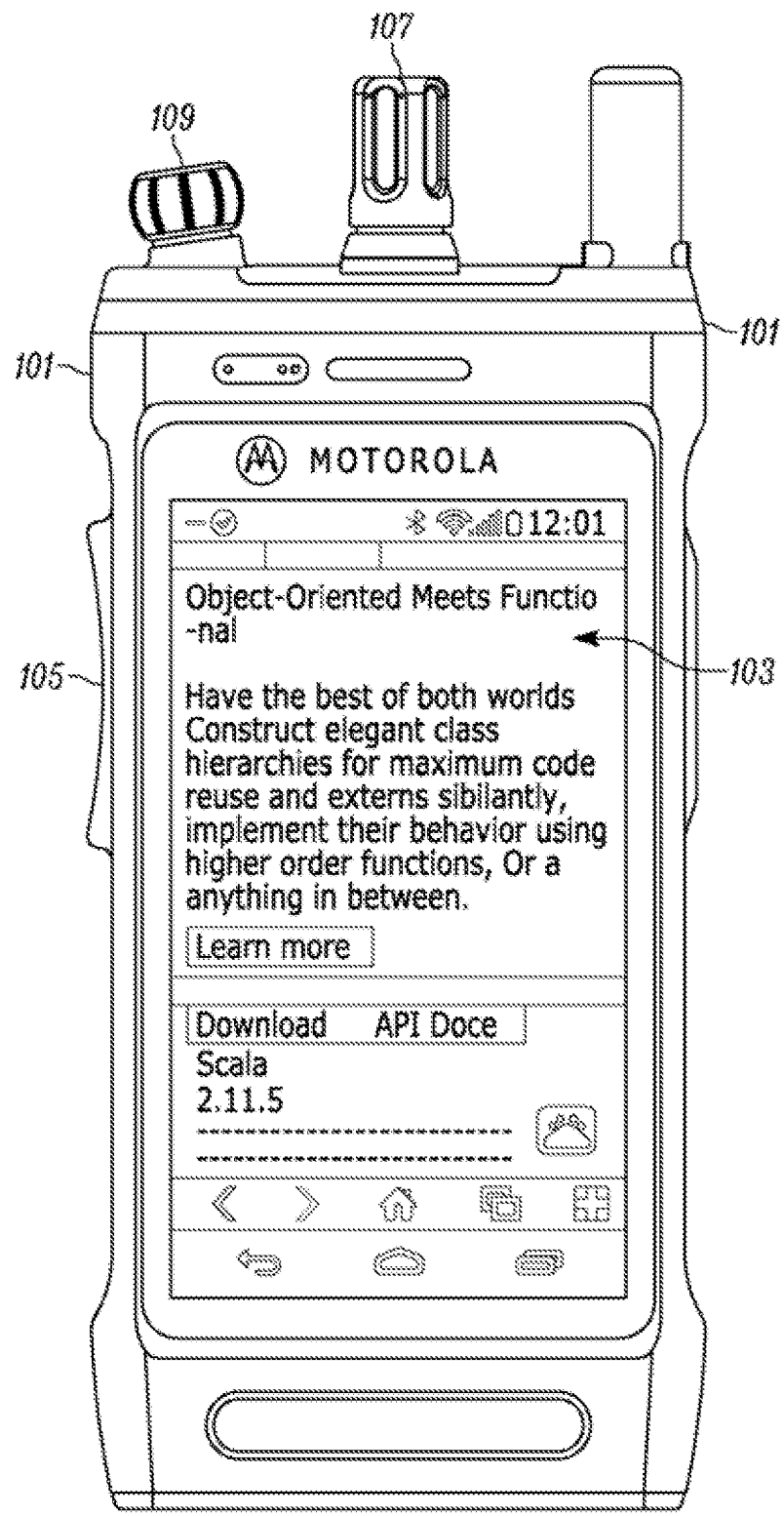
FIGS. 6A through 6C illustrate user inputs received by the communication device of FIG. 1 for adjusting a font size of text displayed by the communication device according to one embodiment.
Figure 6B:
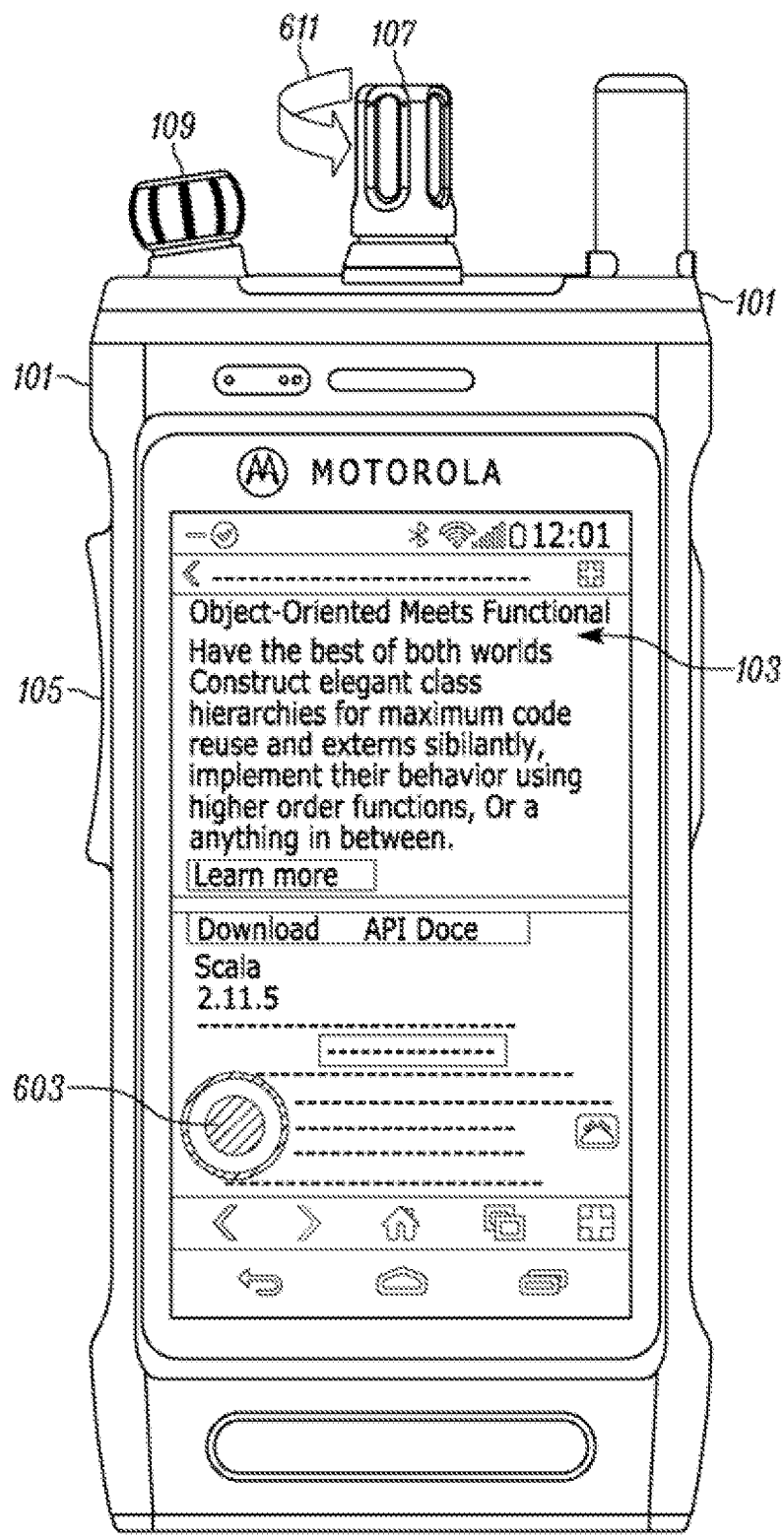
Figure 6C:
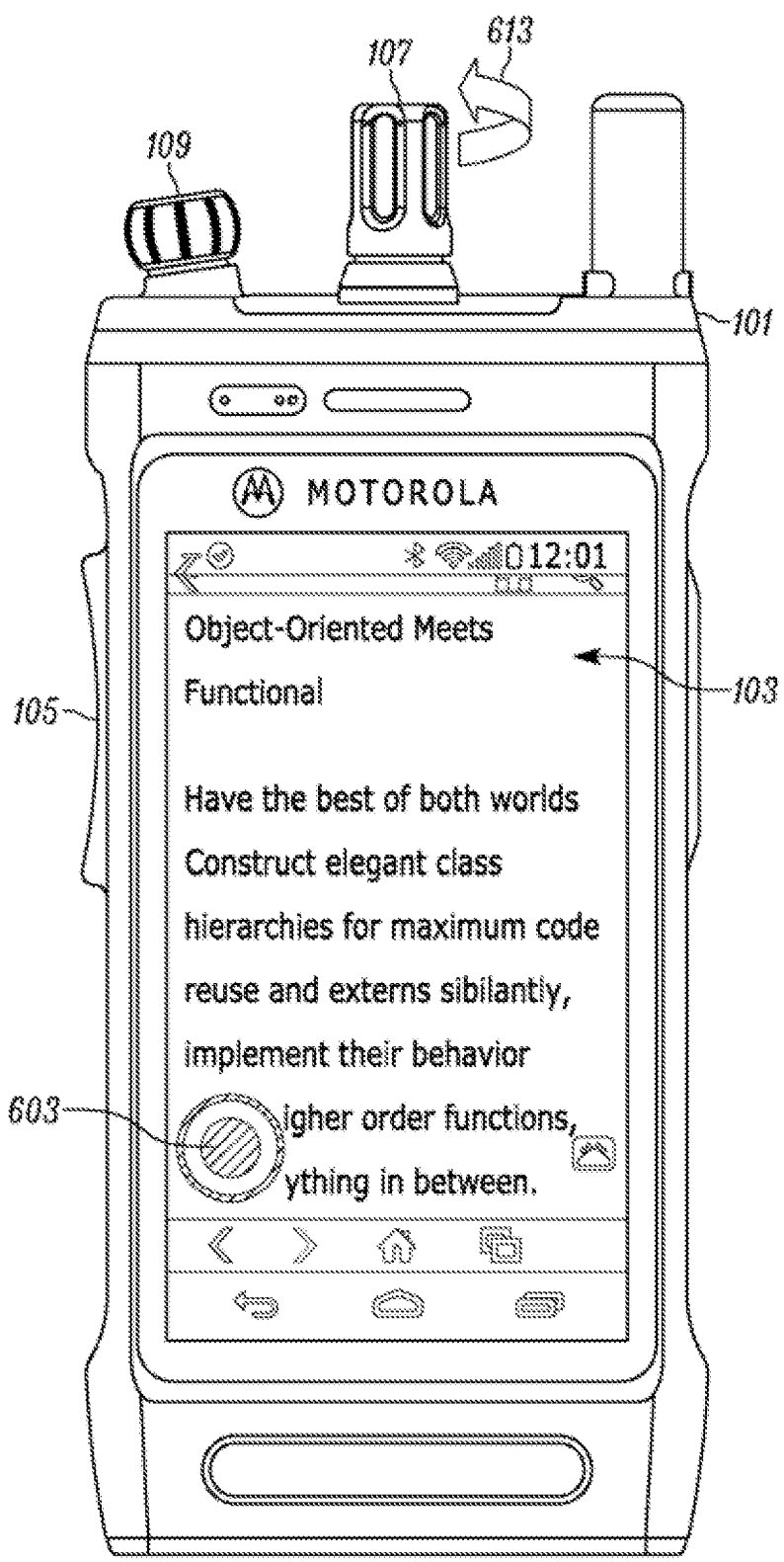

FIGS. 6A-6C illustrate another example of a communication device 101 configured to perform an action related to the software application 215 using a secondary mode of a mechanical interface. In particular, FIGS. 6A-6C illustrate a sequence of outputs provided through the touch screen 103. In FIG. 6A, a software application 215 outputs text through the touch screen 103 in a first font size (e.g., a default font size). As illustrated in FIG. 6B, when the communication device receives a user input from the touch screen 103 (e.g., at touch screen location 603) and simultaneously receives a rotational input from the channel selection knob 107, the communication device 101 changes the font size of the displayed text. For example, the communication device 101 can increase or decrease the font size based on the rotational input from the channel selection knob 107. For example, the communication device 101 may increase the displayed font size when the channel selection knob 107 is rotated clockwise 613 (see FIG. 6C) and may decrease the displayed font size when the channel selection knob 107 is rotated counter-clockwise 611.

Figure 7A:
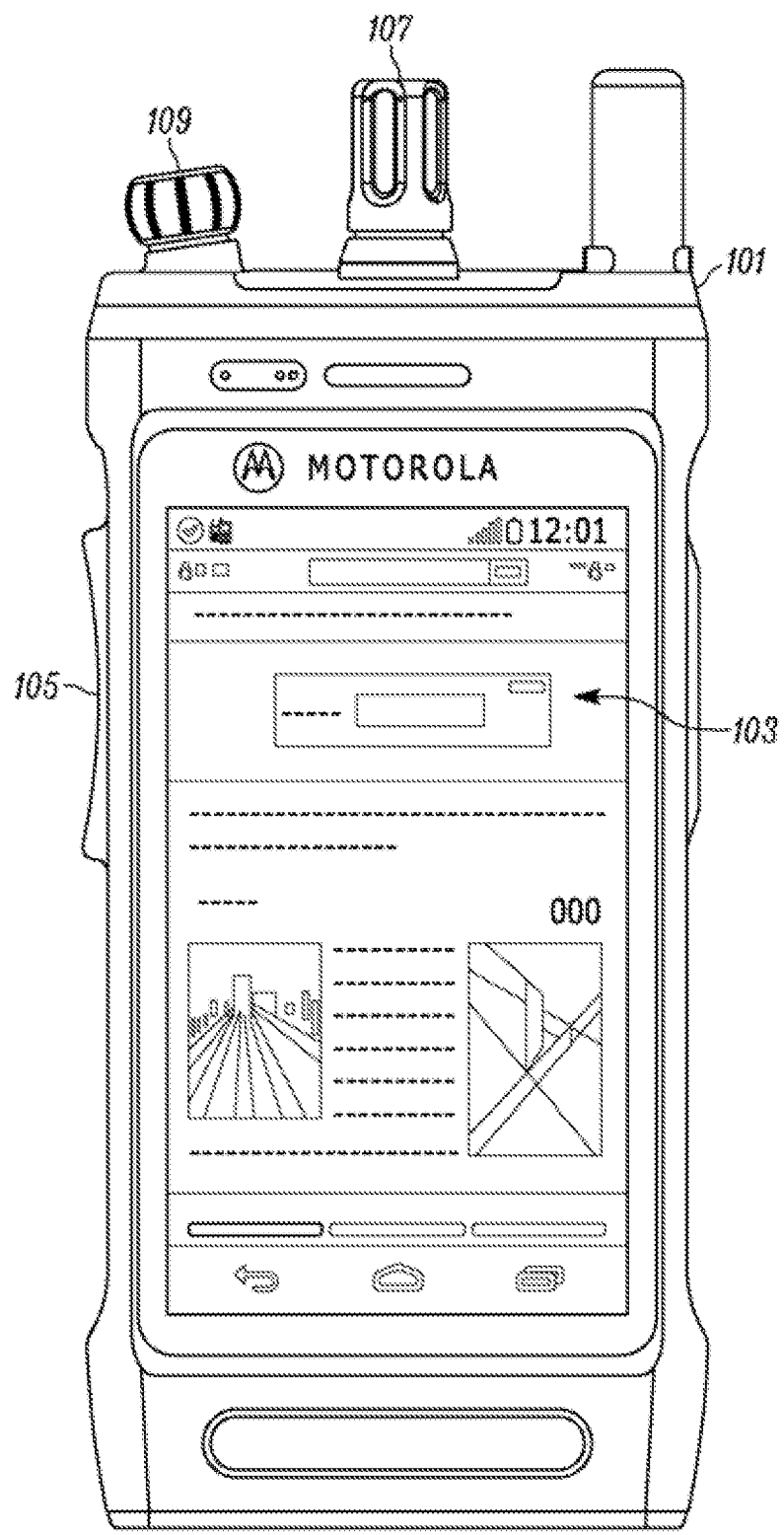
FIGS. 7A through 7C illustrate user inputs received by the communication device of FIG. 1 for navigating webpages displayed by the communication device according to one embodiment.
Figure 7B:
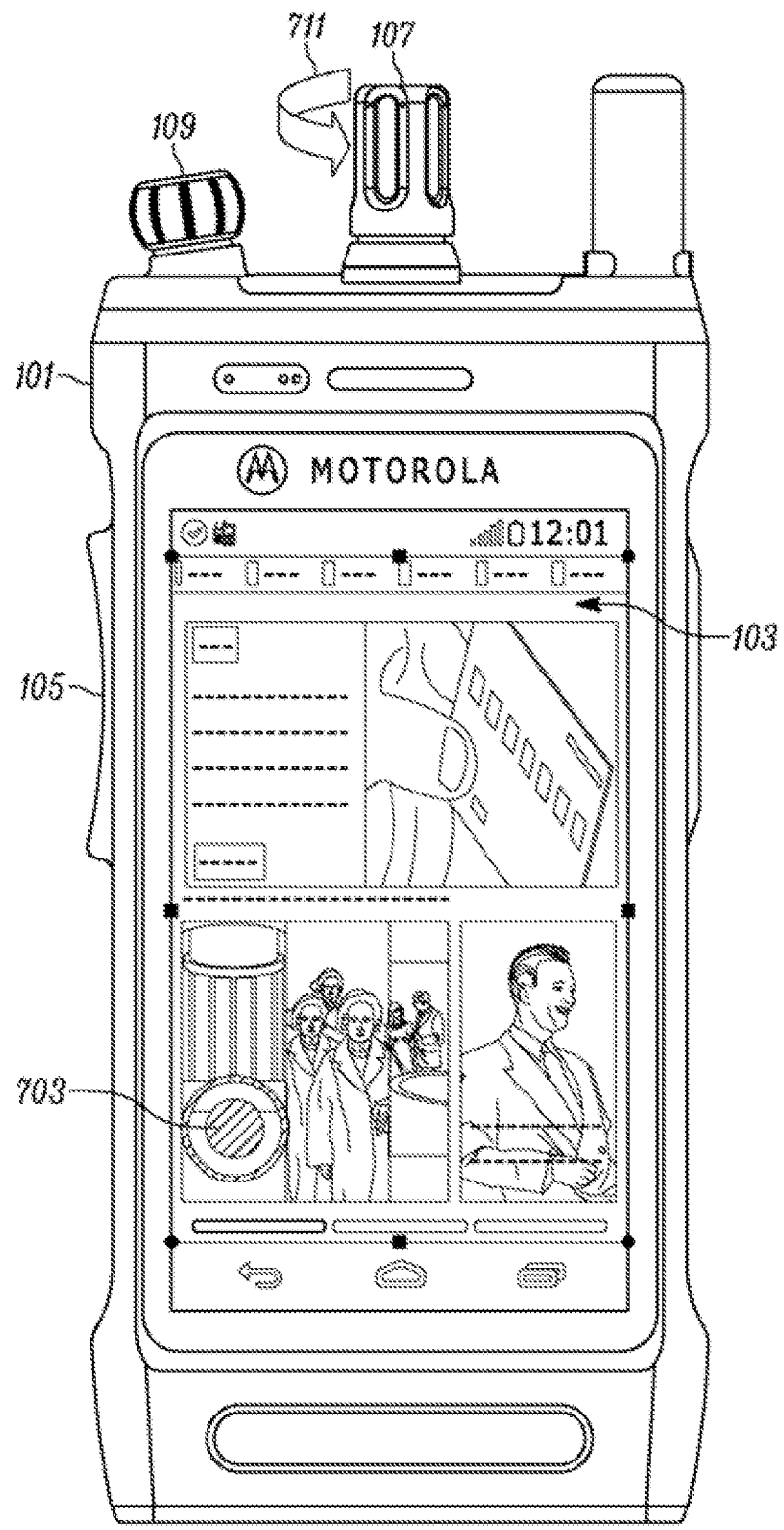
Figure 7C:
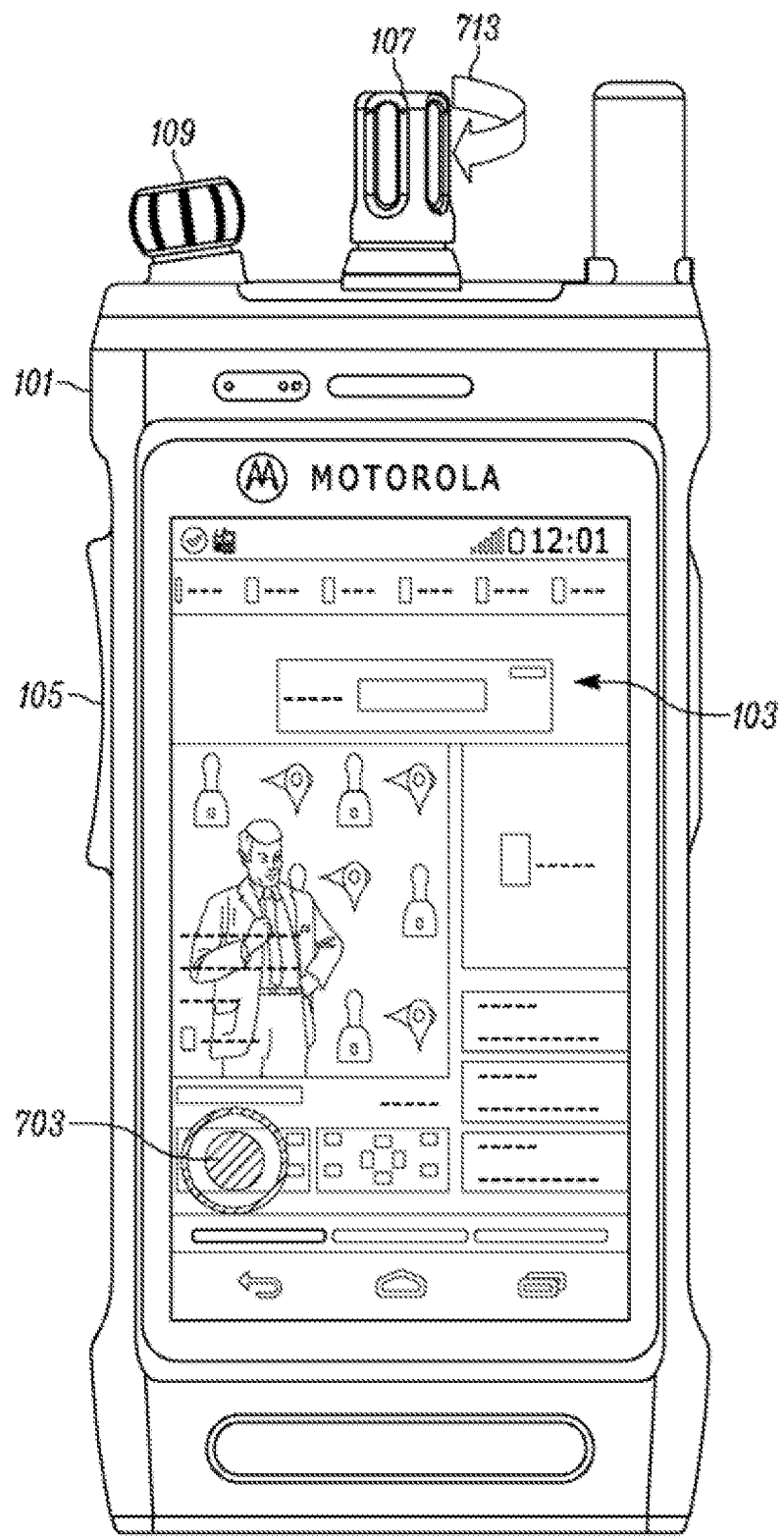

FIGS. 7A-7C illustrate yet another example of a communication device 101 configured to perform an action related to the software application 215 when using a secondary mode of a mechanical interface. In particular, FIGS. 7A-7C illustrate a sequence of webpages displayed on the touch screen 103. In FIG. 7A, a first webpage is displayed via a browser software application. As illustrated in FIGS. 7B and 7C, when the communication device 101 receives a touch input on the touch screen 103 (e.g., location 703) and simultaneously receives a rotary input from the channel selection knob 107, the communication device 101 communicates with the browser software application to display another webpage on the touch screen 103 (e.g., a previous web age or a subsequent webpage). For example, in some embodiments, rotation of the channel selection knob 107 counter-clockwise 711 causes the communication device 101 to display a previous webpage and rotation of the channel selection knob 107 clockwise 713 causes the communication device 101 to display a subsequent webpage.

Figure 8A:
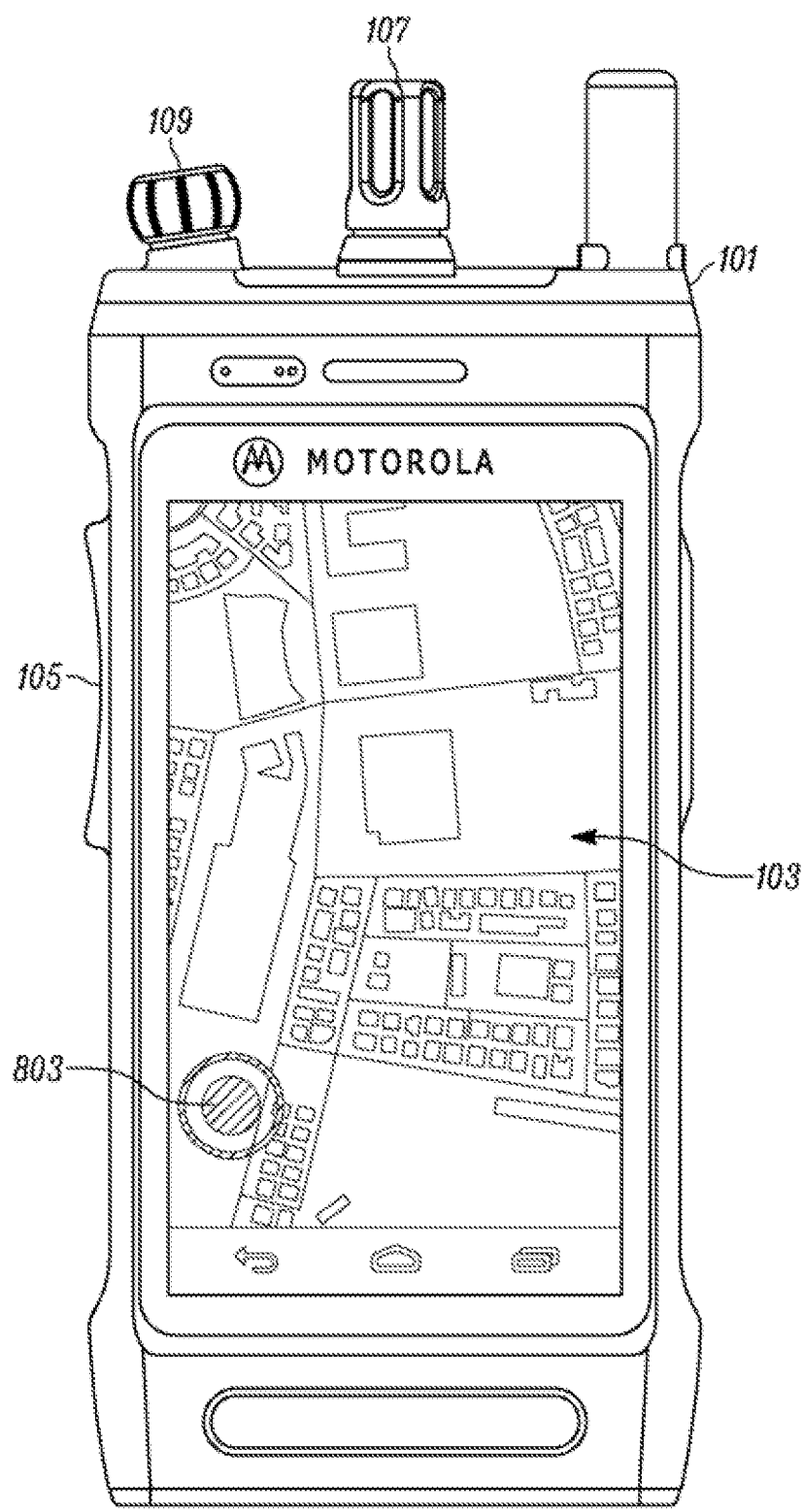
FIGS. 8A through 8C illustrate user inputs received by the communication device of FIG. 1 for changing a zoom level of a map displayed b the communication device according to one embodiment.
Figure 8B:
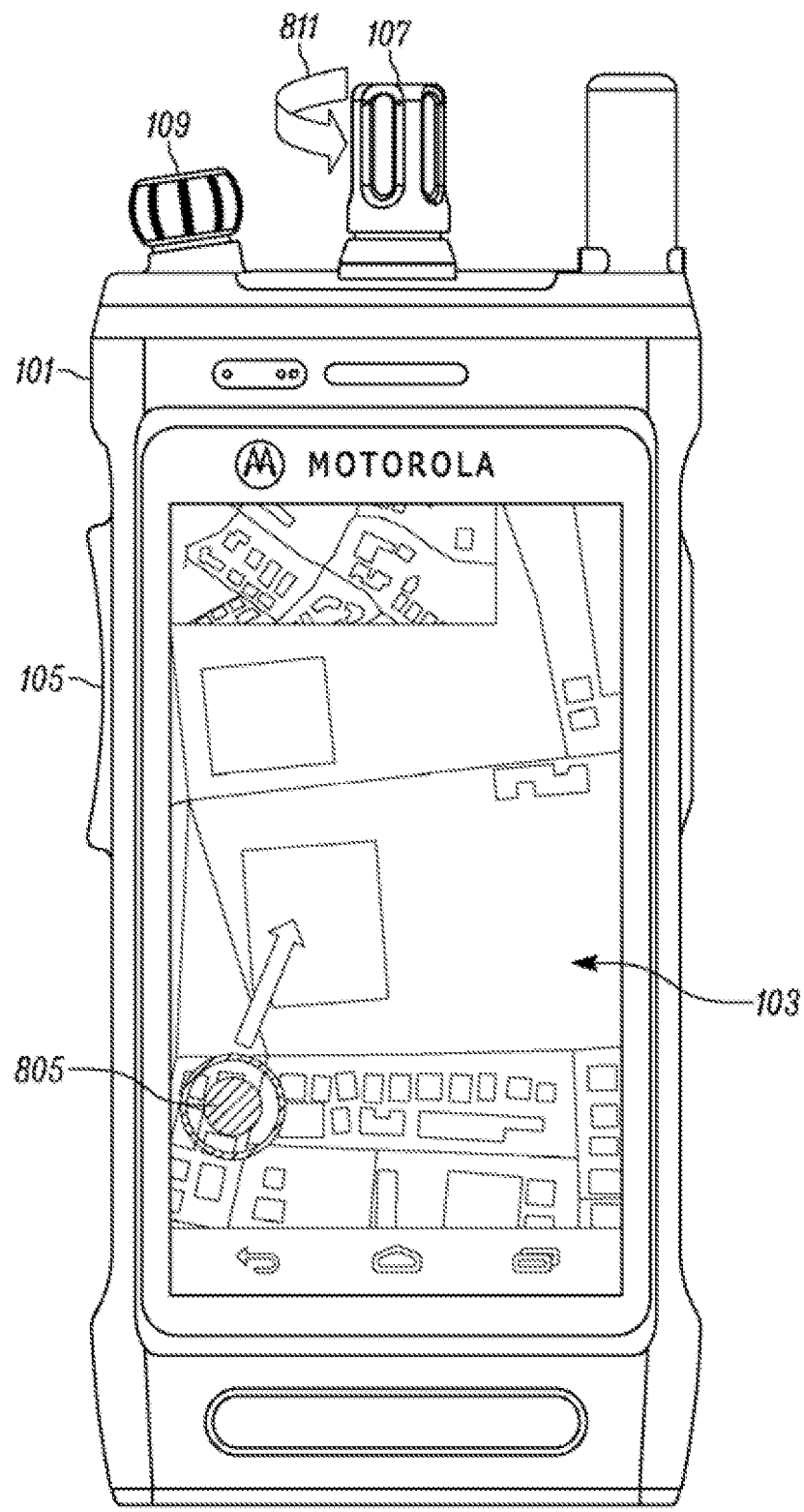
Figure 8C:
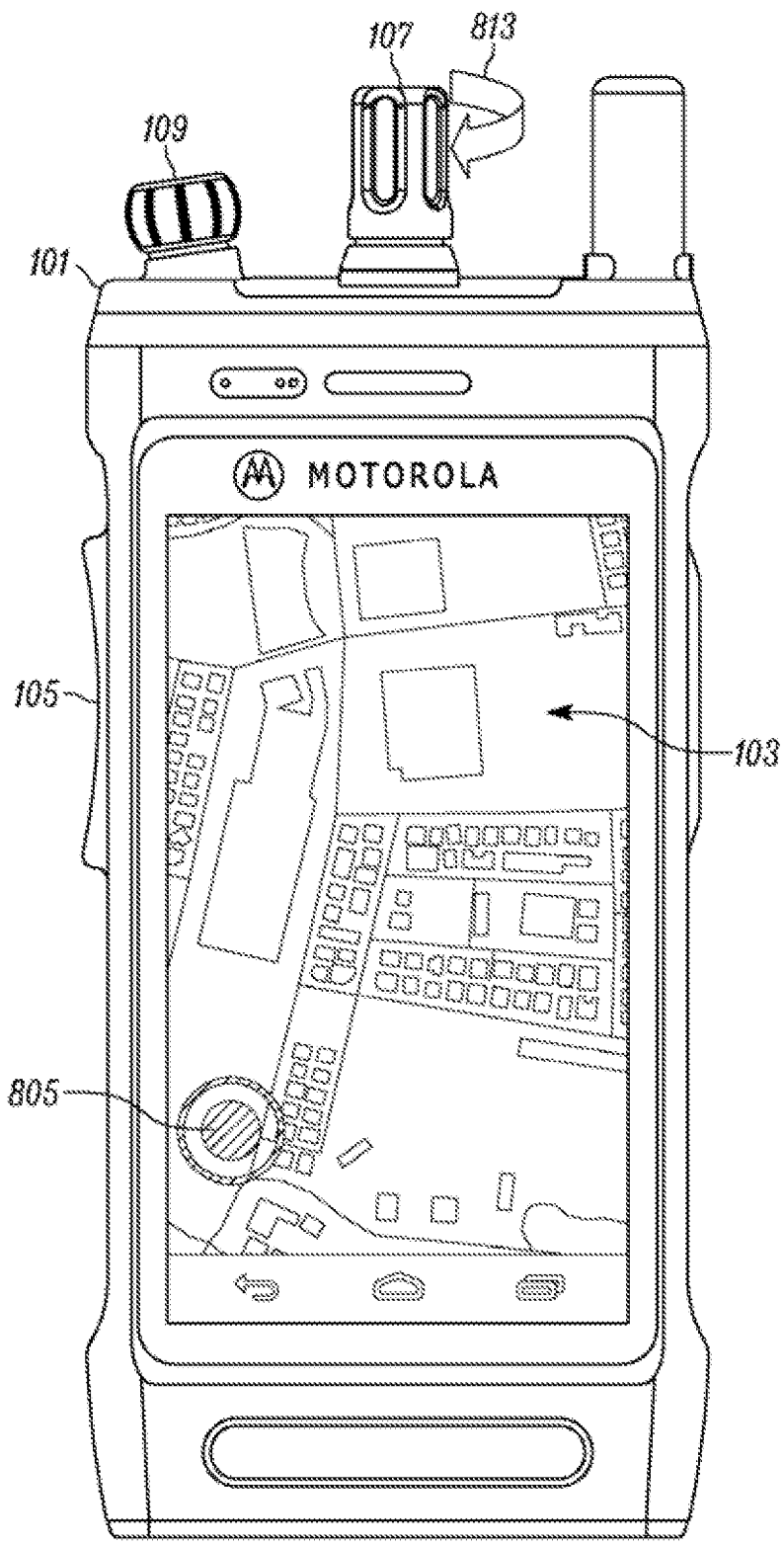

FIGS. 8A-8C illustrate yet another example of a communication device 101 configured to perform an action related to the software application 215 when using secondary mode of a mechanical interface. In this example, a sequence of map images generated by a map software application (e.g., a navigation software application) is displayed on the touch screen 103. In FIG. 8A, the touch screen 103 displays a map at a first zoom level (e.g., a default level). As illustrated in FIG. 8B, when the communication device 101 receives a user input on the touch screen 103 (e.g., at location 803) and simultaneously receives a rotary input from the channel selection knob 107, the communication device 101 changes the zoom level of the map. For example, in some embodiments, rotation of the channel selection knob 107 counter-clockwise 811 increases the zoom level of the displayed map (e.g., zooms in) and rotation of the channel selection knob 107 clockwise 813 decreases the zoom level of the displayed map (e.g., zooms out). Also, in some embodiments, the map output by the map software application with the changed zoom level is centered based on the location 803. In some embodiments, when the communication device 101 receives a user input of releasing contact with the touch screen 103, the displayed map is maintained at the last selected zoom level.

Figure 9A:
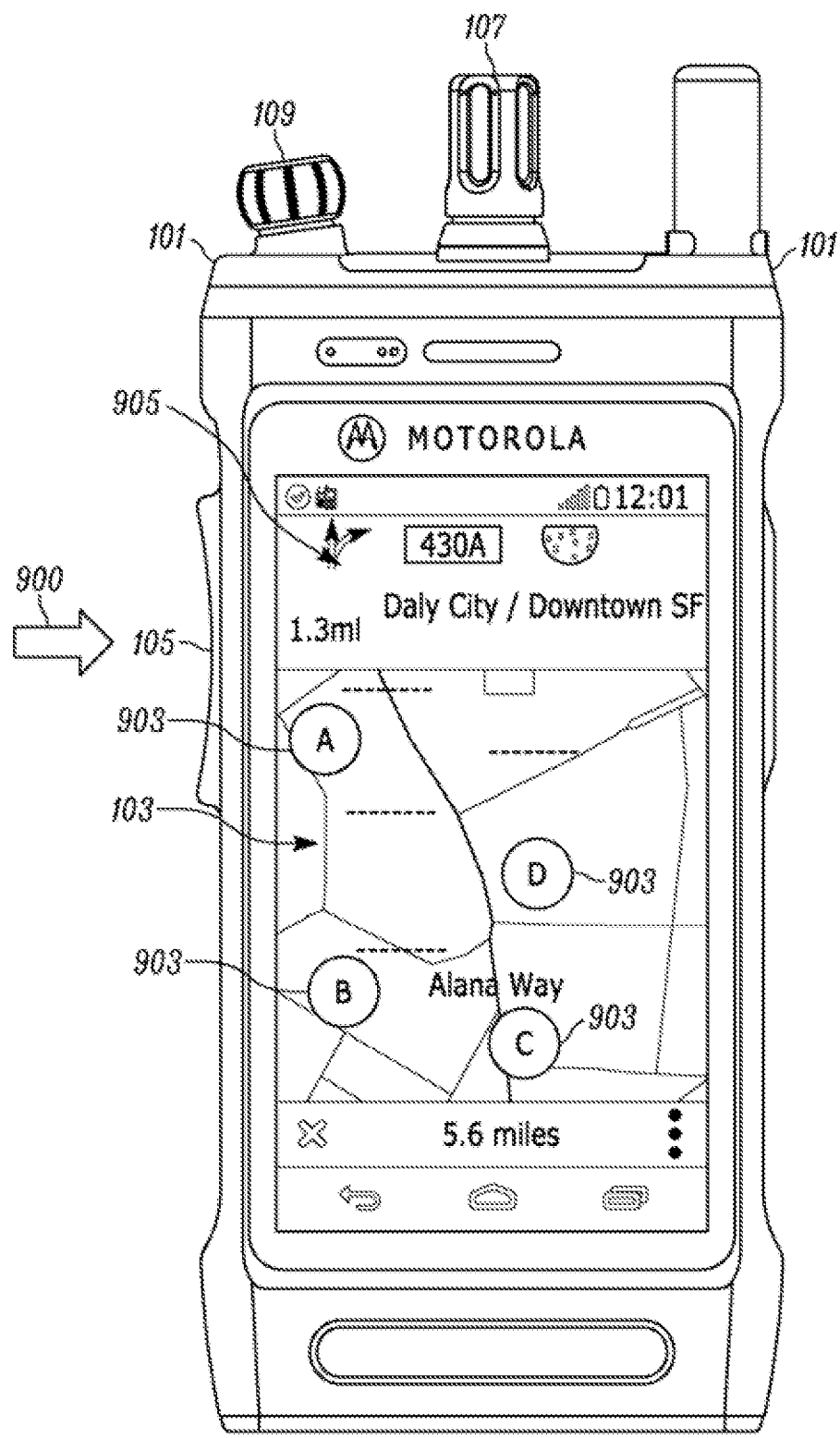
FIG. 9A through 9B illustrate user inputs received by the communication device of FIG. 1 for establishing communication with an object tracked by a software application executed by the communication device according to one embodiment.
Figure 9B:
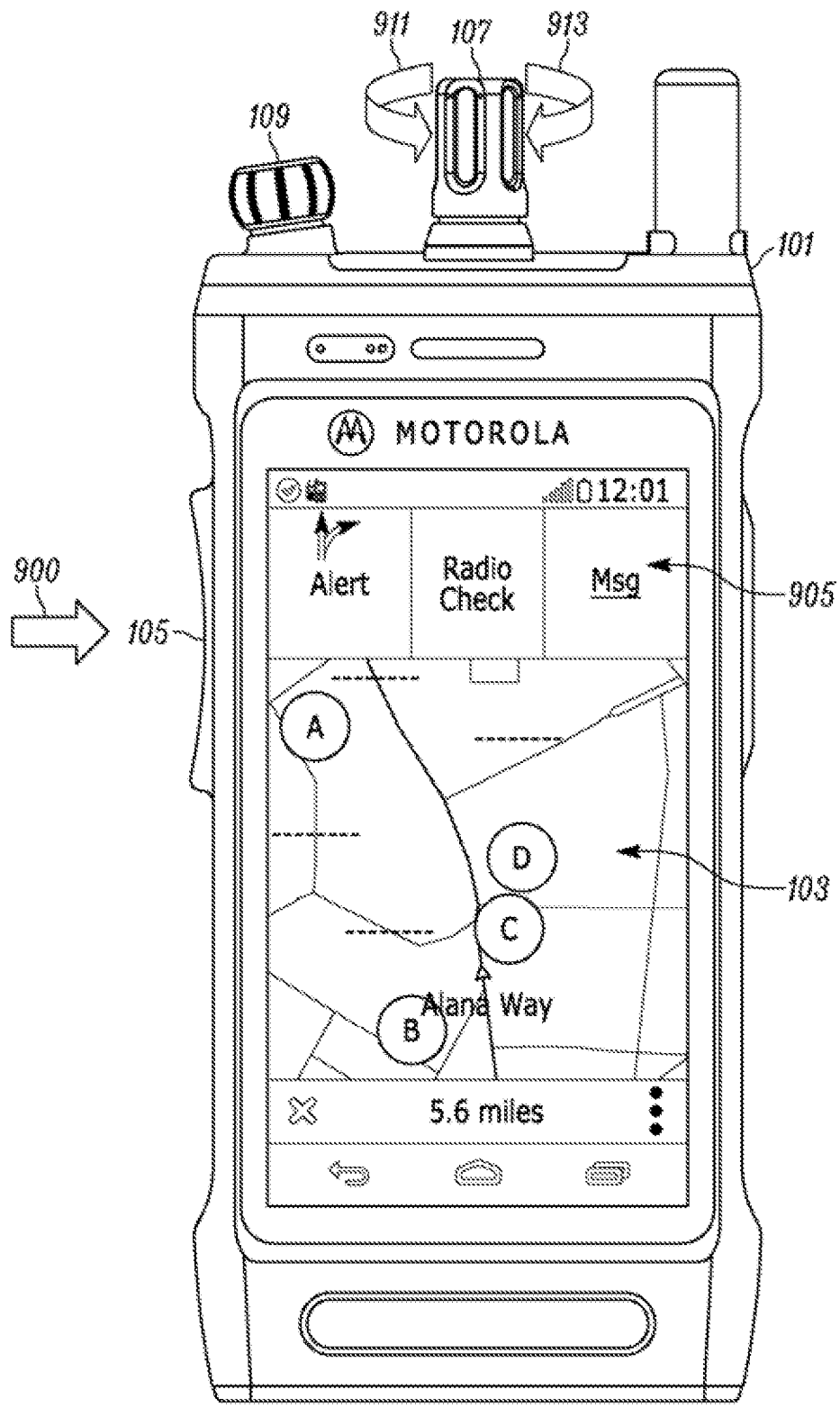

FIGS. 9A-9B illustrate yet another example of the communication device 101 configured to perform an action related to the software application 215 when using a secondary mode of a mechanical interface. In this example, a software application 215 executed by the communication device 101 tracks objects 903 (e.g., within a map). The tracked objects 903 can be people, equipment, environmental conditions e.g., tornados, storms, etc.), and the like. In some situations, the tracked objects 903 include other communication devices configured to wirelessly communicate with the communication device 101. Accordingly, within a public safety environment, the communication device 101 tracks the location of public safety personnel and may select a particular communication device to communicate with (e.g., a communication device located closest to an incident location). Therefore, when the communication device detects a user input on the touch screen 103 (e.g., touches one of the tracked objects 903 displayed within a map as illustrated in FIG. 9A) and simultaneously receives a rotary input from the channel selection knob 107, the communication device 101 displays a communication menu 905. The communication menu 905 includes a plurality of selectable icons representing different modes of communication for communicating with a selected object 903 (e.g., sending an alert, performing a radio cheek, sending a message, and the like).

When the communication device 101 detects a continuous user input from the touch screen 103 and receives a rotary input from the channel selection knob 107, the communication device 101 scrolls through the icons until contact from the touchscreen 103 is no longer detected (see FIG. 9B). When the communication device 101 receives a counter-clockwise rotation 911, the communication device 101 highlights and/or selects an icon to the left of the currently highlighted/selected icon. Similarly, when the communication device 101 receives a clockwise rotation 913, the communication device 101 highlights and/or selects an icon to the right of the currently highlighted/selected icon. When the communication device 101 detects that the user input from the touch screen 103 is removed, the communication device 101 activates a communication mode based on the selected icon, and thus communicates with the selected tracked object 903 using the selected communication mode. Accordingly, the communication device 101 uses user input from the channel selection knob 107 to quickly establish communication with a particular tracked object (e.g., without requiring that the user first exit the tracking software application and manually establish communication with an object). Also in some embodiments, the communication menu 905 is superimposed on the map tracking the objects 903, which continues to be updated by the tracking software application. Therefore, the communication device 10 updates the location of tracked objects 903 even while establishing communication with a particular object.

Thus, embodiments of the invention provide methods and systems for providing dual-function mechanical interfaces for a communication device 101 that allow efficient interactions with software applications 215 executed by the communication device 101 (e.g., allowing quick navigation through menus and performance of common or mission critical tasks efficiently).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action front another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "a" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing device") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication device comprising:
a memory including non-transitory computer-readable medium;
a mechanical interface configured to receive a first user input;
a touch screen configured to display an output and to receive a second user input; and
an electronic processor configured to
execute a software application stored in the memory,
determine when the second user input is received simultaneously with the first user input,
perform a first action based on the first user input when the second user input is not received simultaneously with the first user input, the first action being unrelated to operation of the software application, and
perform a second action based on the first user input when the second user input is received simultaneously with the first user input, the second action including executing a second software application different from the first software application and displaying a second output generated by the second software application on the touch screen of the communication device.

2. The communication device of claim 1, wherein the electronic processor is further configured to determine a location of the second user input on the touch screen and the electronic processor is configured to perform the second action based on the location of the second user input on the touch screen.

3. The communication device of claim 1, further comprising a transceiver, the transceiver configured to communicate via at least two different communication networks.

4. The communication device of claim 3, wherein the at least two different communication networks include a cellular network and a radio network.

5. The communication device of claim 1, wherein the mechanical interface includes a rotatable knob.

6. The communication device of claim 5, wherein the rotatable knob includes a channel selection knob.

7. The communication device of claim 1, wherein the electronic processor is configured to perform the second action by transmitting data displayed on the touch screen to a predetermined destination.

8. The communication device of claim 1, wherein the electronic processor is configured to perform the second action by displaying a menu including a plurality of selectable icons and executing the second software application based on a selection of one of the plurality of selectable icons.

9. The communication device of claim 1, wherein the electronic processor is configured to perform the second action by changing a size of text displayed on the touch screen.

10. The communication device of claim 1, wherein the electronic processor is configured to perform the second action by navigating from a first webpage displayed on the touch screen to a second webpage.

11. The communication device of claim 1, wherein the electronic processor is configured to perform the second action by changing a zoom level of a map displayed on the touch screen.

12. The communication device of claim 1, wherein the electronic processor is configured to perform the second action by establishing communication with a second communication device.

13. The communication device of claim 5, wherein the rotatable knob includes a volume knob.

14. The communication device of claim 1, wherein the mechanical interface includes a push button.

15. The communication device of claim 14, wherein the push button includes a push-to-talk button.

16. A method of operating, a communication device, the method comprising:
executing, with an electronic processor, a first software application and displaying a first output generated by the first software application on a touch screen of the communication device;
receiving, with an electronic processor, a first user input from a mechanical internee of the communication device;
receiving, with the electronic processor, a second user input from the touch screen;
determining, with the electronic processor, when the second user input is received simultaneously with the first user input;
performing a first action based on the first user input when the second user input is not received simultaneously with the first user input, the first action being unrelated to operation of the first software application; and
performing a second action based on the first user input when the second user input is received simultaneously with the first user input, the second action includes executing a second software application different from the first software application and displaying a second output generated by the second software application on the touch screen of the communication device.

17. The method of claim 16, wherein receiving the first user input from the mechanical interface includes receiving rotation of a rotatable knob and wherein performing the first action based on the first user input includes changing a transmission channel.

18. The method of claim 16, wherein receiving the first user input from the mechanical interface includes receiving rotation of a rotatable knob and wherein performing the first action based on the first user input includes changing a volume level.

19. The method of claim 12, wherein receiving the first user input from the mechanical interface includes receiving depression of a push button and wherein performing the first action based on the first user input includes transmitting an audio message.

* * * * *